United States Patent
Miyake

(10) Patent No.: US 9,578,192 B2
(45) Date of Patent: *Feb. 21, 2017

(54) IMAGE FORMING APPARATUS INCLUDING A PLURALITY OF DEVICES DRIVEN BY POWER

(71) Applicant: CANON KABUSHIKI KAISHA, Tokyo (JP)

(72) Inventor: Kazunori Miyake, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,092

(22) Filed: Dec. 17, 2015

(65) Prior Publication Data

US 2016/0105574 A1   Apr. 14, 2016

Related U.S. Application Data

(63) Continuation of application No. 14/479,182, filed on Sep. 5, 2014, now Pat. No. 9,232,105.

(30) Foreign Application Priority Data

Sep. 30, 2013  (JP) .................................. 2013-204057

(51) Int. Cl.
- G06F 3/12 (2006.01)
- H04N 1/00 (2006.01)
- H04N 1/46 (2006.01)

(52) U.S. Cl.
CPC ...... *H04N 1/00408* (2013.01); *H04N 1/00477* (2013.01); *H04N 1/00891* (2013.01); *H04N 1/00896* (2013.01); *H04N 1/00954* (2013.01); *H04N 1/46* (2013.01); *H04N 2201/0091* (2013.01); *H04N 2201/0094* (2013.01)

(58) Field of Classification Search
None
See application file for complete search history.

(56) References Cited

U.S. PATENT DOCUMENTS

| 6,917,767 B2 | 7/2005 | Kabashima |
| 7,530,568 B2 | 5/2009 | Uchida et al. |

(Continued)

FOREIGN PATENT DOCUMENTS

JP   2011197417 A   10/2011

OTHER PUBLICATIONS

U.S. Appl. No. 14/479,174, filed Sep. 5, 2014. Applicant: Kazunori Miyake.

*Primary Examiner* — Dung Tran
(74) *Attorney, Agent, or Firm* — Fitzpatrick, Cella, Harper & Scinto

(57) ABSTRACT

An image forming apparatus comprising a plurality of devices driven by power and configured to be operated in: 1) a standby mode in which the image forming apparatus stands by a start of an image formation; or 2) a power saving mode in which power supply to a part of the plurality of devices is stopped so that the power consumption of the image forming apparatus in the power saving mode is reduced compared with that of the image forming apparatus in the standby mode. The image forming apparatus further including a door which is opened when consumable material is supplied, and a door opened/closed sensor configured to detect the door opening or door closing.

9 Claims, 10 Drawing Sheets

(56) References Cited

U.S. PATENT DOCUMENTS

| | | |
|---|---|---|
| 7,570,892 B2 | 8/2009 | Nakazato et al. |
| 7,949,264 B2 | 5/2011 | Mae et al. |
| 8,121,496 B2 | 2/2012 | Matsuzaki |
| 8,380,088 B2 | 2/2013 | Oh |
| 8,743,384 B2 | 6/2014 | Ishii et al. |
| 8,761,616 B2 | 6/2014 | Hotogi |
| 8,913,911 B2 * | 12/2014 | Peters .................. G03G 15/221 399/81 |
| 2004/0105695 A1 | 6/2004 | Seo |
| 2005/0012776 A1 | 1/2005 | Kato et al. |
| 2005/0110898 A1 | 5/2005 | Ryu |
| 2007/0237537 A1 * | 10/2007 | Hasegawa .............. G03G 15/55 399/81 |
| 2009/0022503 A1 | 1/2009 | Mae et al. |
| 2009/0074430 A1 * | 3/2009 | Nakazato ........... G03G 15/5004 399/13 |
| 2011/0080605 A1 | 4/2011 | Wakamiya et al. |
| 2011/0305467 A1 | 12/2011 | Umezawa |
| 2014/0147133 A1 | 5/2014 | Sato |

\* cited by examiner

IMAGE FORMING APPARATUS INCLUDING A PLURALITY OF DEVICES DRIVEN BY POWER

This application is a continuation of U.S. application Ser. No. 14/479,182, filed Sep. 5, 2014 (pending), the contents of which are incorporated herein by reference.

BACKGROUND OF THE INVENTION

Field of the Invention

The present invention relates to a control technology adapted when consumable material such as a toner is exchanged when an image forming apparatus is in a power saving mode Description of the Related Art Recently, an image forming apparatus comprising a power saving mode, which reduces standby power when the image forming device is deactivated, is being established (For example, United States Patent Application Publication No. 2011/0080605). Such image forming apparatus needs to respond to a facsimile reception and a print job reception while reducing power when the image forming apparatus is in the power saving mode. Therefore, the image forming apparatus stops power supply to an engine controller when it is in the power saving mode while supplying power to an image controller communicating with outside.

Also, it is highly desired to achieve power saving in the image forming apparatus. The image forming apparatus is therefore controlled to shift from a standby mode, during which the image forming apparatus stands by a start of an image formation, to the power saving mode after the image formation. This increases a time-period during which the image forming apparatus stands by in the power saving mode.

Further, recently, consumable material such as recovery toner container, which is used to recover toner or transfer residual toner as removed, is often exchanged by a user. For example, some image forming apparatus display an exchange procedure on an operation unit. In the exchange procedure, the user depresses a power saving mode release button and the like mounted on the operation unit of the image forming apparatus. This returns the image forming apparatus from the power saving mode to the standby mode. In response to this, the exchange procedure is displayed on the operation unit.

However, when the consumable material such as the toner or the recovery toner container is exchanged while the image apparatus is in the power saving mode, a circuit for detecting the exchange of the consumable material is not powered on. Therefore, there remains a problem that it is not possible to detect whether or not the consumable material is exchanged by the user.

If it is configured such that information on residual amount of the consumable material such as toner is not held by the consumable material itself, the residual amount of the consumable material is managed by the image forming apparatus. Therefore, when the consumable material is exchanged in such a configuration, there causes a mismatch between the residual amounts of the consumable material such as toner recorded on the image forming apparatus and the actual residual amount of the consumable material (actual residual amount) mounted on the image forming apparatus. This may cause a situation in which a sign such as "Prepare toner bottle", "Exchange recover toner bottle" and the like does not disappear so that the image forming apparatus cannot shift to the power saving mode.

Also, in this state, if the image forming apparatus is caused to be shifted to the power saving mode, as long as the image forming apparatus is returned from the power saving mode to the standby mode by the user's depression of the power saving mode release button mounted on the operation unit, the information to guide the exchange procedure may not be displayed on a display screen.

SUMMARY OF THE INVENTION

According to an aspect of the present disclosure, an image forming apparatus includes a plurality of devices driven by power and configured to be operated in: 1) a standby mode in which the image forming apparatus stands by a start of an image formation; or 2) a power saving mode in which power supply to a part of the plurality of devices is stopped so that the power consumption of the image forming apparatus in the power saving mode is reduced compared with that of the image forming apparatus in the standby mode. The apparatus further comprising: a door which is opened when consumable material is supplied; a detection unit configured to detect whether or not the consumable material is required to be supplied; a door opened/closed detection unit configured to detect the door opening or door closing when the image forming apparatus is in either the standby mode or the power saving mode; a display unit configured to display information; and a control unit configured to display a guide to supply the consumable material on the display unit when the door opening is detected by the door opening/closing detection unit in the power saving mode and it is detected by the detection unit that the consumable material is required to be supplied.

Further features of the present invention will become apparent from the following description of exemplary embodiments (with reference to the attached drawings).

DESCRIPTION OF THE EMBODIMENTS

Now, an embodiment of the present invention is described. With reference to the drawings, an electrophotographic image forming apparatus is explained as an example. In the following embodiment, the image forming apparatus is powered on and initialization operation is performed. Thereafter, the mode of the image forming apparatus is shifted to a standby mode. The image forming apparatus executes image formation depending on a job reception, such as a copy job while it is in standby mode. The image forming apparatus further has a preset time period for finishing job, and holds the standby mode while the preset time period is elapsed. Then, the image forming apparatus is automatically shifted to a power saving mode (sleep mode) for reducing power of the image forming apparatus.

Here, the standby mode is a mode during which the image forming apparatus is standing by the image formation. In the standby mode, after an instruction to execute image formation is input, the image forming apparatus can immediately execute an image forming operation. The power saving mode is a mode during which some of a plurality of devices are stopped so that power consumption (standby power) is reduced compared with when the image forming apparatus is in the standby mode.

<Image Forming Apparatus>

Figure 1A:
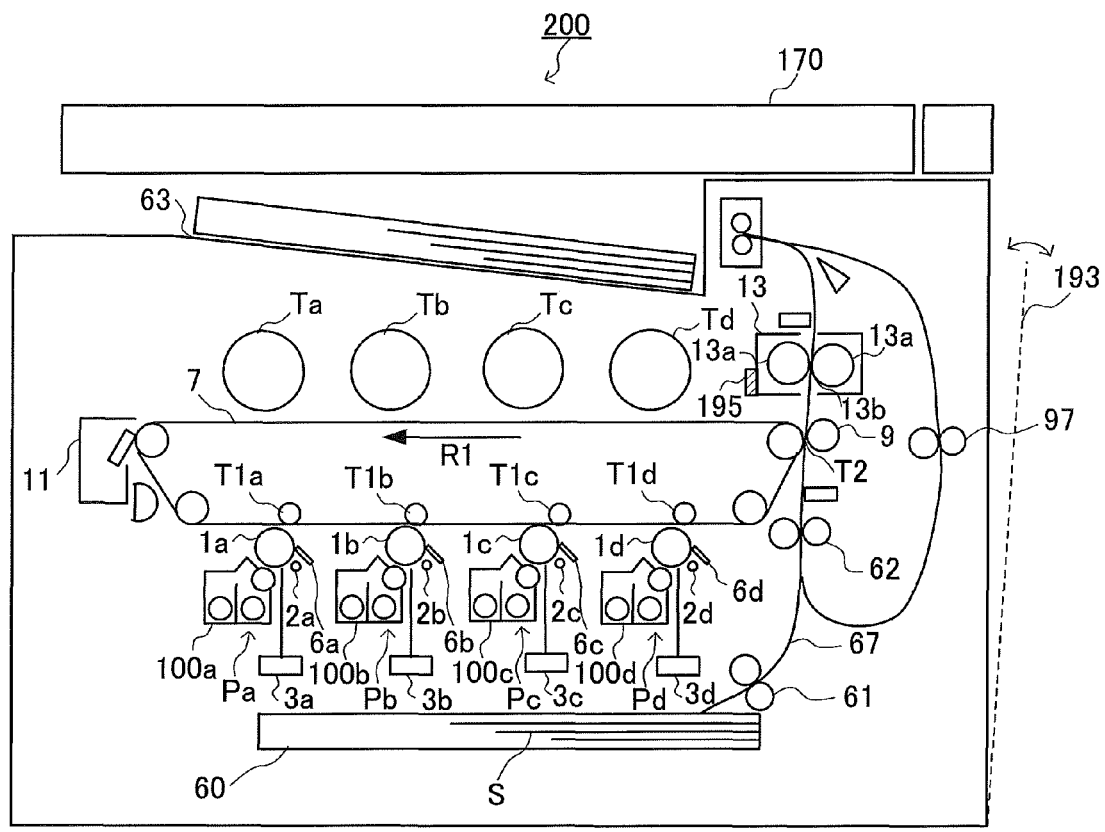
FIGS. 1A and 1B are diagrams illustrating a configuration summary of an image forming apparatus according to the present embodiment.
Figure 1B:
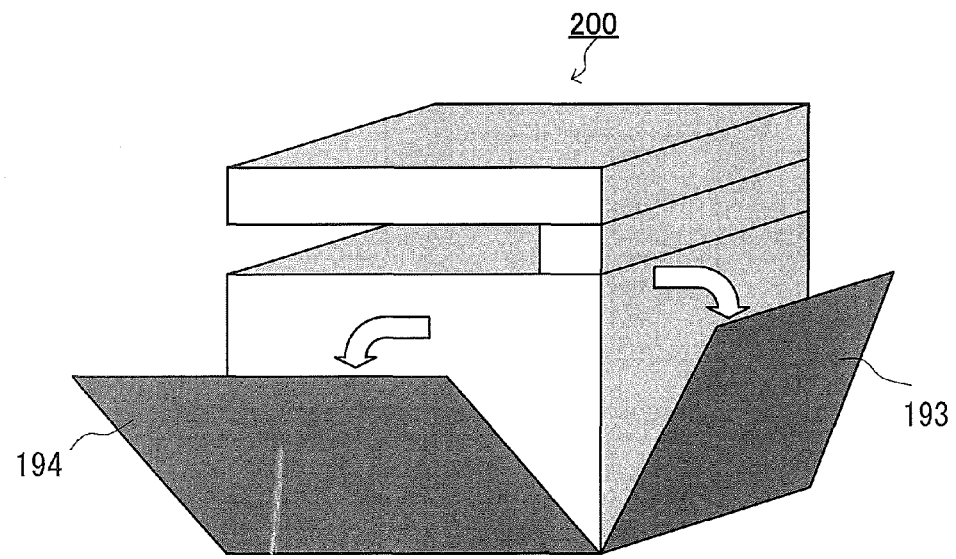

FIGS. 1A and 1B are diagrams illustrating an example of a configuration of an image forming apparatus according to the present embodiment.

FIG. 1A is a schematic vertical sectional view illustrating a configuration of an image forming apparatus 200. FIG. 1B is a perspective view of an example of door configuration of the image forming apparatus 200.

The image forming apparatus 200 illustrated in FIG. 1A comprises a reading process unit (scanner) 170 for reading a document. The image forming apparatus includes image forming units Pa, Pb, Pc, and Pd respectively corresponding to four colors (yellow (y), magenta (M), cyan (C), black (K)). The image forming units Pa, Pb, Pc, and Pd are arranged along an intermediate transfer belt 7. It means that the image forming apparatus 200 is an intermediate transfer tandem-type image forming apparatus. Recently, the intermediate transfer tandem system is gaining popularity as it can enhance productivity and can handle various media conveyance. Note that the number of colors is not limited to the adaptable four colors. The number of colors may be only one such as black (BK) corresponding to monochrome. Also, the order of the colors is not limited to this. Also, each configuration device of the image forming apparatus 200 is controlled by an image processing controller section 150 (FIG. 2) and a control section 190 (FIG. 2) as will be described later. The detail thereof will be described later.

Description is made with regard to an image forming process by the image forming apparatus 200.

Recording Material Conveying Process

A recording material S illustrated in FIG. 1A is a sheet on which an image is formed. The recording material S is stored in a recording material storage 60. The recording material S is fed from the recording material storage 60 by a sheet feed roller pair 61. The recording material S is then conveyed to a registration roller pair 62 via a conveyance path 67. In the registration roller pair 62, skew correction is made to the recording material S. Also, timing to convey the recording material S is adjusted. Thereafter, the recording material S is sent to a secondary transfer unit T2.

The secondary transfer unit T2 is a transfer nip portion formed by an opposing secondary transfer inner roller 8 and a secondary transfer outer roller 9. By an application of predetermined pressure and electrostatic load bias, the secondary transfer unit T2 transfers toner images, which will be described later, on the recording material S.

<Image Formation Process>

The image forming unit Pa in FIG. 1A is generally comprised of a photosensitive member 1a, a charging device 2a, an exposure device 3a, a primary transfer device 4a, a photosensitive cleaner 6a, and a developing device 100a. Also, the image forming unit Pb is generally comprised of a photosensitive member 1b, a charging device 2b, an exposure device 3b, a primary transfer device 4b, a photosensitive cleaner 6b, and a developing device 100a. The image forming unit Pc is generally comprised of a photosensitive member 1c, a charging device 2c, an exposure device 3c, a primary transfer device 4c, a photosensitive cleaner 6c, and a developing device 100c. The image forming unit Pd is generally comprised of a photosensitive member 1d, a charging device 2d, an exposure device 3d, a primary transfer device 4d, a photosensitive cleaner 6d, and a developing device 100d.

Description will be made, by exemplifying the image forming unit Pa, with regard to the image forming process which is synchronously performed with a conveyance process, thorough which, the recording material S is conveyed to the secondary transfer unit T2.

The surface of the photosensitive member 1a of the image forming unit Pa is uniformly charged by the charging device 2a in advance and is rotationally driven. The exposure device 3a forms, based on a signal of image information obtained by reading a document by a reading process unit 170, electrostatic latent images on the surface of the photosensitive drum 1a.

The development device 100a develops the electrostatic latent images formed on the photosensitive drum 1a as a toner image. Thereafter, a predetermined pressure and electrostatic load bias are applied to the toner image by a primary transfer device T1a. The toner image is then transferred to the intermediate transfer belt 7.

The toner which is not transferred and left on the photosensitive member 1a is recovered by the photosensitive cleaner 6a. The image forming process as above is also executed in each of the image forming units Pb, Pc, and Pd. The development devices 100a, 100b, 100c, and 100d store toners of corresponding colors. The toner includes two-component toner which mixes nonmagnetic toner and magnetic carrier in advance or one-component toner which includes one of magnetic toner or nonmagnetic toner. In the image forming apparatus 200 of the present embodiment, the two-component toner is used. The description is made accordingly.

When toner amount for the development devices 100a, 100b, 100c and 100d is decreased, the toner is supplied through a toner supply device (not shown) which is mounted on each toner storage part (hereinafter referred to as toner bottle) Ta, Tb, Tc, and Td. Also, when toner amount in the toner supply device (not shown) is decreased, the toner is supplied from the corresponding toner bottle Ta, Tb, Tc, and Td.

The intermediate transfer belt 7 in FIG. 1A is mounted on an intermediate transfer belt frame (not shown). The intermediate transfer belt 7 is conveyed and driven in the direction of R1 in FIG. 1.

In the image forming process of each color, each color is processed in parallel by the image forming units Pa, Pb, Pc, and Pd. Each color is transferred on the toner image of the color which has previously and primarily been transferred on the intermediate transfer belt 7. As a result, full color toner images are formed on the intermediate transfer belt 7.

Then, the toner images are transferred to the recording material S in the secondary transfer part T2. Note that the toner not transferred to the recording material S and remained on the intermediate transfer belt 7 is recovered by the transfer cleaner device 11.

<Process after Secondary Transfer>

After the secondary transfer is performed in the secondary transfer part T2, the recording material S is conveyed to a fixing unit 13. The fixing unit 13 is mainly comprised of a pair of rotors (fixing roller 13a), fixing nip part 13b, and a heater (not shown) as a heat source. The fixing rotors are opposingly arranged. The fixing nip part 13b holds and conveys the recording material S formed by the fixing roller 13a. At least one roller of the pair of fixing rollers 13a is connected such that driving power from a driving mechanism (not shown) is transmitted.

The fixing unit 13 gives predetermined pressure and predetermined amount of heat to the recording material S passing through the fixing nip part 13b. Then, the fixing unit 13b melts and fixes the toner images on the recording material S. Thereafter, the recording material S having the images fixed thereon is discharged to the delivery tray 63. Alternatively, in a case where images are formed on both sides of the recording material S, the recording material S is conveyed to an inverting conveyance roller 97.

<Door Configuration>

Next, a configuration of door covering sides of the image forming apparatus 200 is described. FIG. 1B is a schematic perspective view of an example of a door configuration of the image forming apparatus 200. The image forming apparatus 200 comprises two doors. One is a front door unit 194 (herein after referred to as "front door") mounted on a front side when viewed from a front side of the apparatus shown in FIG. 1A. The other is a right door unit 193 (hereinafter referred to as "right door") mounted on a right side when viewed from the front side of the apparatus shown in FIG. 1A. The user opens and closes the front door 194 when exchanging each toner bottle (Ta to Td) or a recovery toner bottle (not shown). The recovery toner bottle is used to store toner which is remained when transferring. The user opens and closes the right door 193 when, for example, JAM process is performed, the fixing unit 13 is exchanged and the intermediate transfer belt 7 is exchanged in the image forming apparatus 200. As mentioned above, when each door is opened, the inside of the apparatus is exposed. This allows the user to access an inside of the image forming apparatus 200 including a conveyance path.

Note that, when the right door 193 is opened, a part of the fixing unit 13 as mentioned above is exposed, which enable the user to insert and remove the fixing unit 13 into and from the image forming apparatus 200. Note that a heater arranged in the fixing unit 13, a thermistor for keeping temperature of the heater in an optimum state, and the like are electrically connected to the image forming apparatus 200 via a drawer connector.

<Control System>

Figure 2:
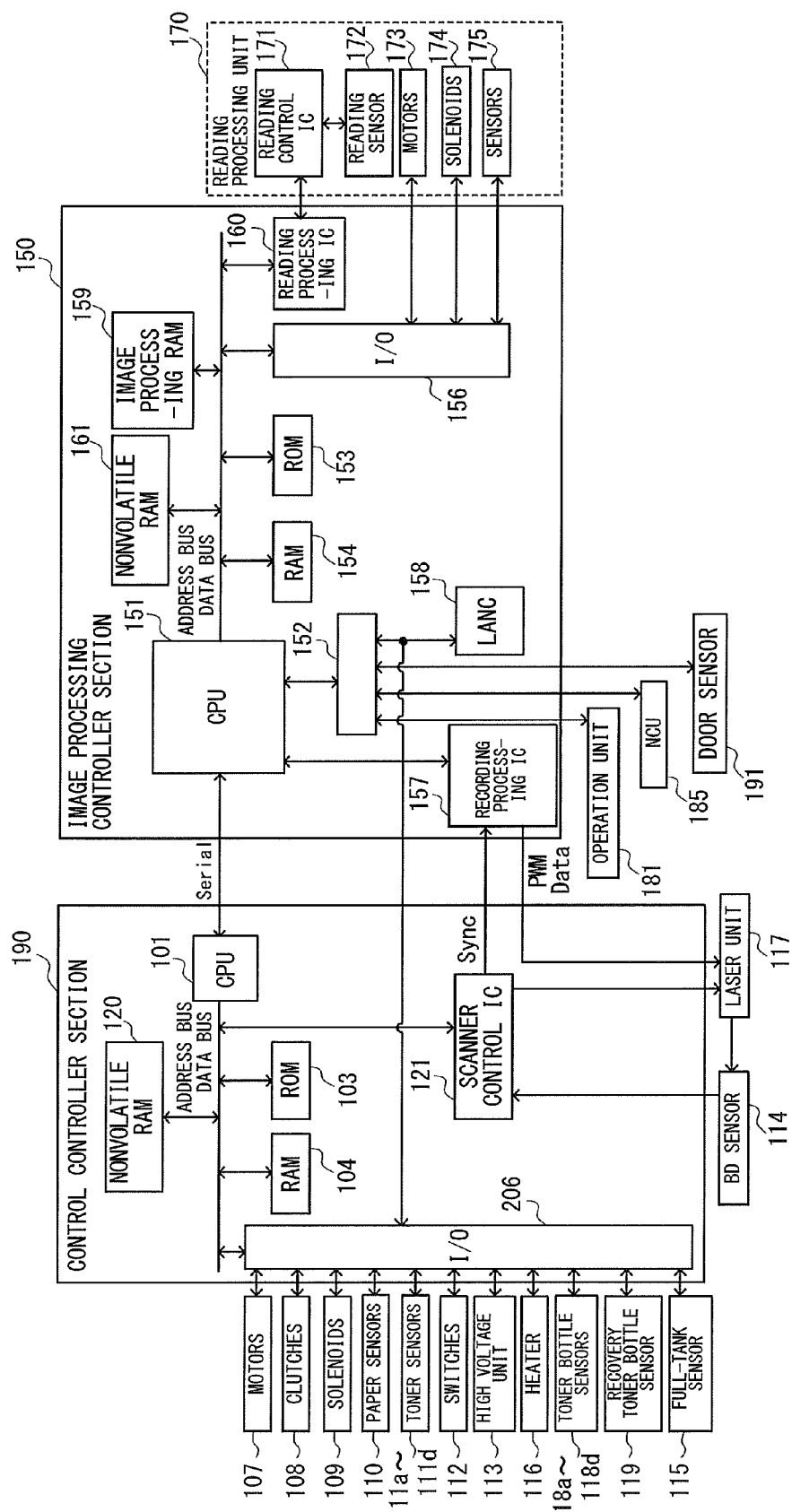
FIG. 2 is a block diagram for explaining an example of a control system of the image forming apparatus.

FIG. 2 is a block diagram for explaining an example of a control system of the image forming apparatus 200. Image forming apparatus 200 is mainly comprised of two controller sections, a control section 190 and an image processing controller section 150.

First, a main function configuration of the control section 190 is described.

The control section 190 as shown in FIG. 2 controls each component of an image forming unit (engine unit) which performs image forming process to the recording material. The control section 190 is comprised of a central processing unit (CPU) 101, a read only memory (ROM) 103, a random access memory (RAM) 104, a nonvolatile random access memory (nonvolatile RAM) 120, a scanner control IC 121, and I/O interface 206. Note that the CPU 101 and each component included in the control section 190 are interconnected via an address bus and a data bus.

The CPU 101 mounted on the control section 190 controls image formation. The CPU 101 sequentially reads program from the ROM 103 in which control procedure (control program) of the apparatus main body is stored. Then, the CPU 101 executes the program. The RAM 104 is used to store input data or used as a working storage area. Also, a nonvolatile RAM 120 is used to store parameter relating to the image forming operation. The I/O interface 206 intermediates the connection between the devices. Using BD signal from a BD sensor 114, the scanner control IC 121 controls rotation of motor (not shown) for rotating a polygon mirror mounted on a laser unit 117. Also, the scanner IC 121 outputs an image synchronization signal to the image processing controller section 150 using the BD signal from the BD sensor 114.

Each device connected to the I/O interface 206 will be described.

Motors 107 as shown in FIG. 2 include motors to drive paper feeding system, conveyance system, and optical system. Clutches 108 start or release transmission of driving force from the motors 107. Solenoids 109 drive paper feeding system, conveyance system and optical system. Paper sensors 110 detect the recording material S conveyed on the conveyance path. Toner sensors 111a to 111d detect toner amount (toner residual amount) from the development devices 100a to 100d respectively. Note that the toner sensors 111a, 111b, 111c, and 111d respectively detect the toner residual amount of yellow, magenta, cyan, and black. In this way, each toner sensor (111a to 111d) operates as a toner amount detection unit for detecting the toner amount in a toner container. Switches 112 detect, for example, home position of movable devices. In accordance with an instruction from the CPU 101, a high voltage unit 113 provides high voltage output required for the image forming process to a primary charger, a developer, a pre-transfer charger, a transfer charger, and a separating charger (not shown). A heater 116 is made of a ceramic substrate and the like. Note that supply of AC voltage is started or stopped based on an on/off signal from the CPU 101. Toner bottle sensors 118a to 118d detect whether or not the toner bottles Ta to Td are respectively attached to the image forming apparatus 200. Note that the toner bottle sensors 118a, 118b, 118c, and 118d respectively detect the presence and absence of the toner bottle of yellow, magenta, cyan, and black. In this way, each toner bottle sensor (118a to 118d) respectively operates as a toner container detection unit. A recovery toner bottle sensor 119 detects whether or not a recovery toner bottle is attached to the image forming apparatus 100. It means that the recovery toner bottle sensor 119 operates as a recovery toner container detection unit. A full-tank sensor 115 detects whether the transfer residual toner as removed can be stored in the recovery toner bottle (not full-tank state) or not be stored in the recovery toner bottle (full-tank state). It means that the full-tank sensor 115 operates as a recovery toner amount detection unit. Note that, if it is detected that the recovery toner is in full-tank state, it is necessary to exchange the recovery toner bottle to operate the image forming apparatus 200.

Next, a main function configuration of the image processing controller section 150 is described.

The image processing controller section 150 performs image processing to an image signal received from the reading processing unit 170 or an external connecting device such as PC to create data to write into the laser unit 117. Also, the image processing controller section 150 stores the image data to which the image processing has been performed in the external connecting device such as PC and storage medium such as USB memory connected to an operation unit 181.

The CPU 151, mounted on the image processing controller 150, sequentially reads program from ROM 153, in which image processing control procedure (image processing control program) is stored. Then, the CPU 151 executes the program. Also, a RAM 154 is a main storage device which is used to store input data or used as a working storage area.

A recording processing IC 157 performs image processing to the image signal received from the reading processing unit 170 or the external connecting device such as PC to create PWM (Pulse Width Modulation) data to output into the laser unit 117. Further, the recording processing IC 157 controls to light laser in accordance with the image data, the laser being mounted on the laser unit 117 via an image signal line. The laser light output from the laser unit 117 is irradiated on the photosensitive drum (not shown) and the drum is exposed. Also, a light emitting state of the laser light is detected by a light receiving sensor of the BD sensor 114. The output signal thereof (BD signal) is then input to the scanner control IC 121.

A nonvolatile RAM 161 is used as a storage area of parameter relating to the image processing. Motors 173, solenoids 174, and sensors 175 mounted on the reading processing unit 170 are connected to an I/O interface 156. A reading processing IC 160 processes image data from a reading sensor 172, mounted on the reading processing unit 170, and drives the reading sensor 172 via a reading control IC 171. An image processing RAM 159 is used as a storage area for temporarily storing data when the data is image-processed. The data includes data received from the reading processing IC 160 and data received from the external connecting device such as PC. A LAN controller 158 controls communication with the external connecting device such as PC connected via LAN cable.

The CPU 151 controls an operation unit 181 and a network control unit (NCU) 185 via an I/O interface 152. The operation unit 181 is a user interface with which the user operates the image forming apparatus 200. The NCU 185 controls facsimile (FAX).

Also, the CPU 151 operates as a door opened/closed detection unit which receives detection result from a door sensor 191 via the I/O interface 152. The door sensor 191 detects open state or closed state of the front door 194 of the image forming apparatus 200.

Note that the operation unit 181 comprises a display screen on which information for directing exchange procedure of consumable material is presented to the user. It means that the operation unit 181, in addition to receiving operation from the user, operates as a display unit for displaying a predetermined guide on the display screen. Also, the I/O interface 152 has a function to control power supply of the image forming apparatus 200. For example, the I/O interface 152 is comprised of devices such as a complex programmable logic device (CPLD) and a field-programmable gate array (FPGA).

Note that when the image forming apparatus 200 is in power saving mode, among the components as shown in FIG. 2, only the I/O interface 152, NCU 185, LAN controller 158, a part of the switches in the operation unit 181, door sensor 191, and the RAM 154 are powered on. As above, when the image forming apparatus 200 is in power saving mode, the image forming apparatus 200 is in a power saving state where only a part of the functions is activated and the rest of the functions are deactivated.

Figure 3:
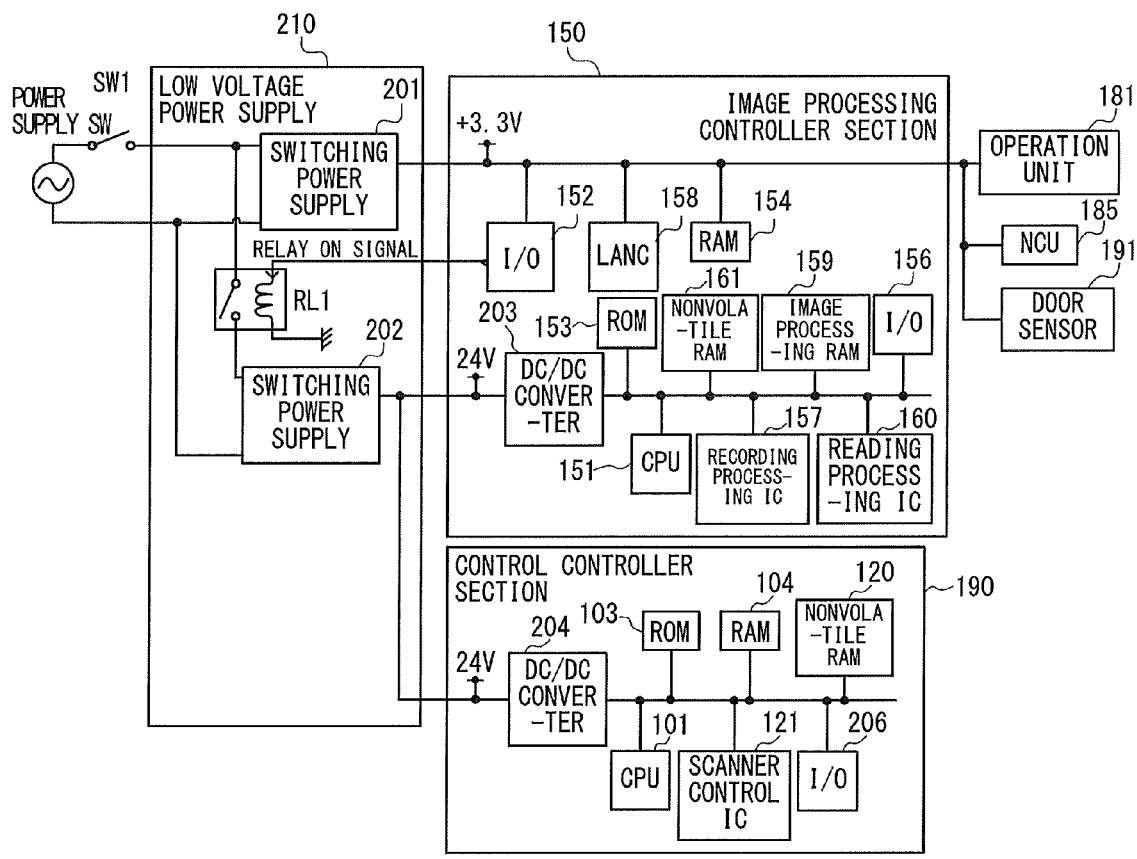
FIG. 3 is a block diagram for explaining an example of a power supply system of the image forming apparatus.

FIG. 3 is a block diagram for explaining an example of a power supply system of the image forming apparatus 200 according to the present embodiment. In the image forming apparatus 200, AC voltage is input to a low voltage power supply 210 via a power supply switch SW1. The low voltage power supply 210 is comprised of a switching power supply 201, a switching power supply 202, and a relay RL 1. The switching power supply 201 and switching power supply 202 respectively are a first power supply and a second power supply.

The switching power supply 201 generates DC 3.3 [V] voltage from the AC voltage. Then, the switching power supply 201 supplies power to the I/O interface 152, the LAN controller 158, and the RAM 154 mounted on the image processing controller section 150. Also, the switching power supply 201 feeds power to the operation unit 181, the NCU 185, and the door sensor 191. Note that the switching power supply 201 also feeds power when the image forming apparatus 200 is in the power saving mode.

The relay RL 1 is ON/OFF controlled by a relay on signal output from the I/O interface 152 mounted on the image processing controller section 150. When the image forming apparatus 200 is in the power saving mode, the relay RL 1 is turned off so as to stop to feed power to the switching power supply 202. As above, when the image forming apparatus 200 is in the power saving mode, the power feeding to each device from the switching power supply 202 (second power supply) is interrupted. As a result, the function of each device connected to the switching power supply 202 is deactivated. This allows reducing the power consumption of the image forming apparatus 200 when it is in the power saving mode.

The switching power supply 202 generates DC 24 [V] voltage from the AC voltage. Then, the switching power supply 202 supplies power to a DC/DC converter 203 and a DC/DC converter 204. The DC/DC converters 203 and 204 are respectively mounted on the image processing controller section 150 and control section 190. The DC/DC converter 203 in the image processing controller section 150 converts the input DC 24[V] to DC 3.3[V] and then, feeds power to the CPU 151, the recording processing IC 157, the reading processing IC 160 and the like. Similarly, the DC/DC converter 204 in the control section 190 converts the input DC 24[V} to DC 3.3[V] and then, supplies power to the CPU 101, scanner control IC 121 and the like.

Note that the first power supply and the second power supply may be the switching power supply which generates DC voltage from a commercial power supply.

<Operation when Exchanging Toner Bottle>

Figure 4A:
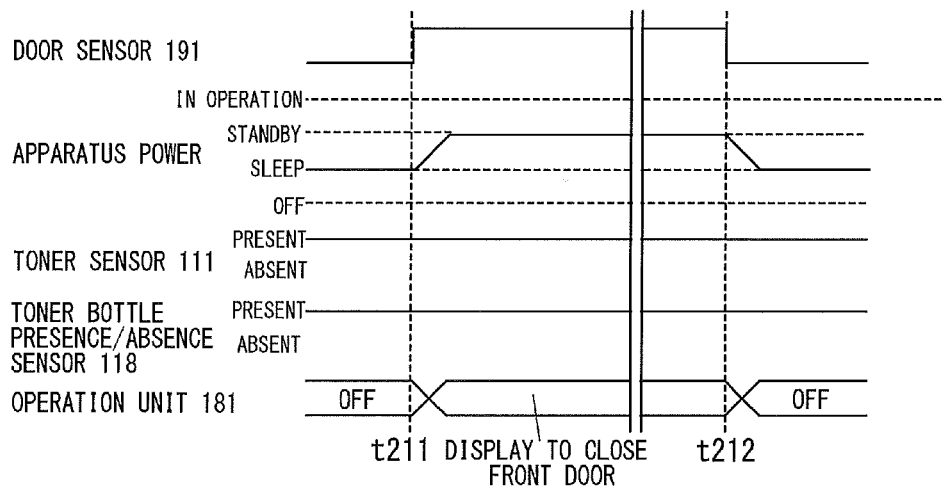
FIGS. 4A and 4B are timing charts when exchanging toner bottle in the image forming apparatus.
Figure 4B:
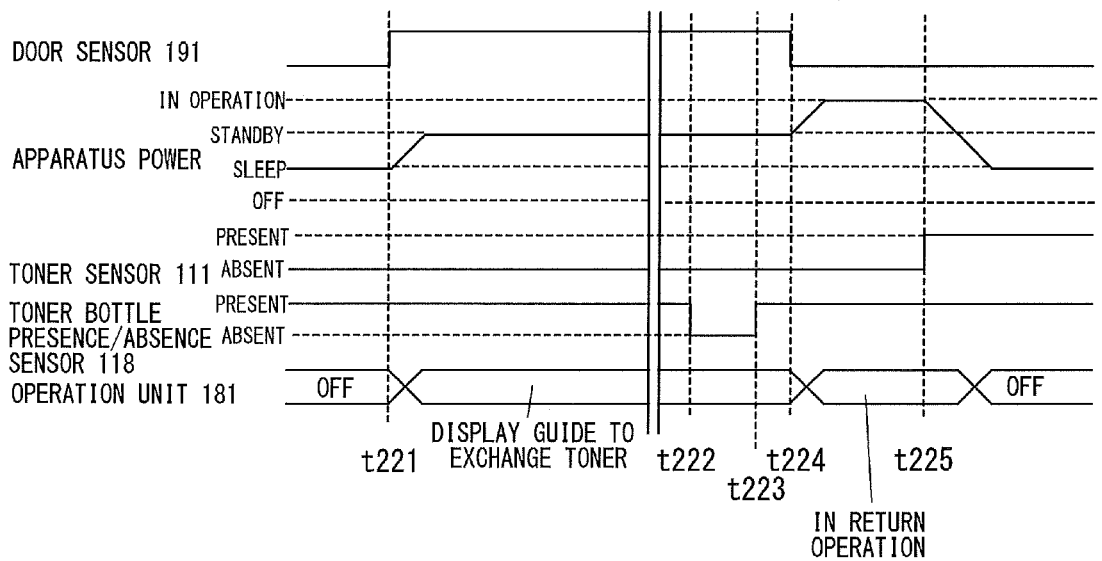

FIGS. 4A and 4B are timing charts when exchanging toner bottle in the image forming apparatus 200. FIG. 4A is a timing chart representing a case where there is toner. FIG. 4B is a timing chart representing a case where there is no toner.

Description will be made with regard to the operation of the image forming apparatus 200 when exchanging the toner bottles Ta, Tb, Tc, and Td.

The operation of the image forming apparatus 200 in a case where "there is toner" is described with FIG. 4A. Note that, for each colors (Y, M, C, K), the state is "there is toner".

When the user opens the front door 194 when the image processing apparatus 200 is in the power saving mode (time t211), an ON signal from the door sensor 191 is detected by the I/O interface 152, and then, a relay ON signal is output. This operates the switching power supply 201. Then, the CPU 151, the CPU 101, and the operation unit 181 are activated. The mode of the image forming apparatus 200 is shifted from the power saving mode to the standby mode.

If it is detected that "there is toner" based on the detection result from the toner sensors (111*a* to 111*d*), the CPU 101 notifies the CPU 151 of "there is toner" information. Based on the information, the CPU 151 causes to display the message of "Please close the front door" on the display screen of the operation unit 181. Thereafter, when it is detected that the front door 194 is closed (time t212), in response to the receipt of notification from the CPU 101 instructing to shift to the power saving mode, the CPU 151 again shifts the image forming apparatus 200 to the power saving mode.

The operation of the image forming apparatus 200 in a case where "there is no toner" is described with FIG. 4B. Note that any color toner of Y, M, C, and K turned "there is no toner" state.

When the user opens the front door 194 (time t221) when the image processing apparatus 200 is in power saving mode, the ON signal from the door sensor 191 is detected by the I/O interface 152, and then, the relay ON signal is outputted. This operates the switching power supply 201. Then, the CPU 151, the CPU 101, and the operation unit 181 are activated. The mode of the image forming apparatus 200 is shifted from the power saving mode to the standby mode.

If any of the color toners is detected that "there is no toner" based on the detection result from the toner sensors (111*a* to 111*d*), the CPU 101 notifies the CPU 151 of the color information and "there is no toner" information. Based on the information, the CPU 151 causes to display a "guide to exchange toner bottle" for the finished color on the display screen of the operation unit 181. The "guide to exchange toner bottle" is information indicating a procedure when the user actually exchanges the toner bottles Ta, Tb, Tc, and Tb.

Thereafter, the user exchanges the toner bottle in accordance with the operation procedure displayed on the operation unit 181 (time t222, time t223). If it is detected that the front door 194 is closed (time t224), the CPU 101 activates a toner return sequence for the finished color. The toner return sequence controls such that the CPU 101 rotationally drives each toner bottle for a predetermined time by a rotation drive part (not shown) such as motor of the image forming apparatus 200 to stir toners in the toner bottles of Ta, Tb, Tc and Td, and then, it is confirmed whether or not the detection result from the toner sensors (111*a* to 111*d*) turns to "there is toner". It means that, after the detection of removal of the toner bottle, e.g., detection of transition from presence to absence of the toner bottle, and the detection of insertion of the toner bottle, e.g., detection of transition from absence to presence of the toner bottle, and before the start of toner amount detection by each toner sensor, the toner bottle is stirred (rotated) for a predetermined time by the rotation drive part.

This prevents erroneous detection of each toner sensor. Note that instead of rotating the toner bottle, a screw for stirring the toner may be provided in the toner bottle to rotate the screw by the rotation drive part.

When the detection result from the toner sensors (111*a* to 111*d*) turns to "there is toner" (time t225), the CPU 101 stops the toner return sequence operation. Then, the CPU 101 notifies the CPU 151 of "there is toner". Upon receipt of the notification of "there is toner" from the CPU 101 and then, in response to the receipt of the notification instructing to shift to the power saving mode, the CPU 151 again shifts the mode of the image forming apparatus 200 to the power saving mode.

Figure 5:
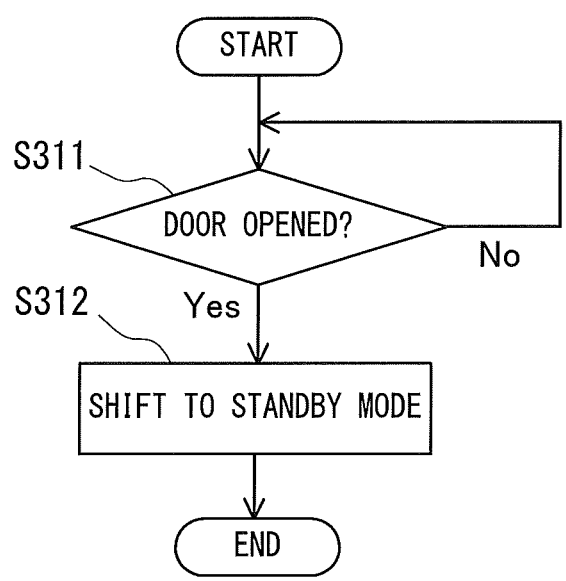
FIG. 5 is a flowchart illustrating an example of process procedure of the image forming apparatus when a front door is opened by user.

FIG. 5 is a flowchart illustrating an example of process procedure of the image forming apparatus 200 when the front door 194 is opened by the user. The process is mainly executed by the I/O interface 152 mounted on the image processing controller section 150. Note that, when exchanging the recovery toner bottle, which will be described later, the I/O interface 152 executes similar process. The I/O interface 152 decides whether or not the detection result from the door sensor 191 indicates that the front door 194 of the image forming apparatus 200 is opened. If the detection result indicating that the door 194 is opened is received (S311: Yes), the I/O interface 152 shifts the image forming apparatus 200 to the standby mode by outputting the relay ON signal (S312). It means that the I/O interface 152 operates as a mode shift unit for shifting the mode of the image forming apparatus 200 from the power saving mode to the standby mode. Controlling in this way, every time when the front door 194 of the image forming apparatus 200 is opened, the CPU 151 is activated.

Figure 6:
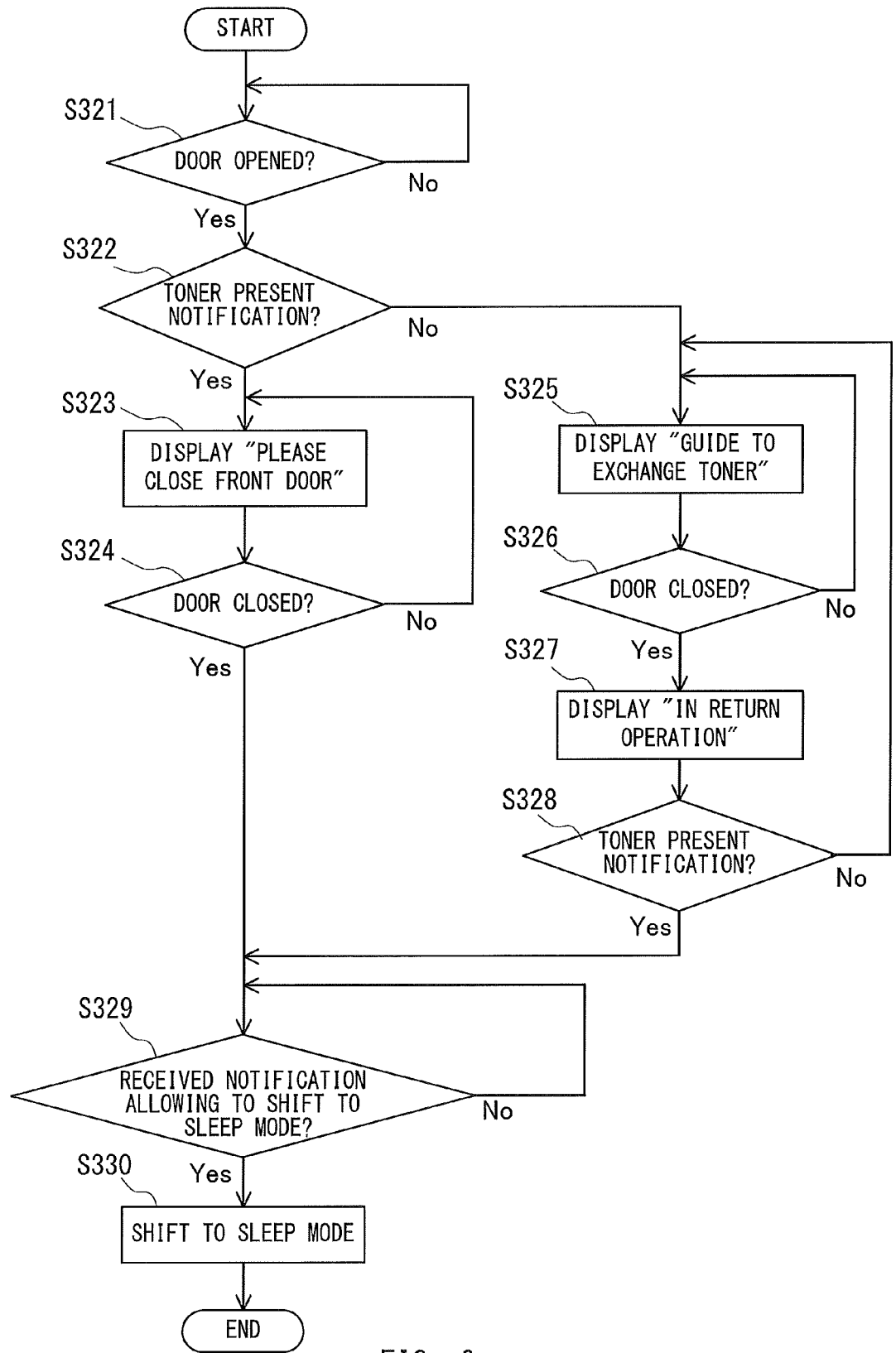
FIG. 6 is a flowchart illustrating an example of process procedure of the image forming apparatus when exchanging toner bottle.

FIG. 6 is a flowchart illustrating an example of process procedure of the image forming apparatus 200 when exchanging the toner bottles (Ta to Td). Note that this process represents a process procedure when the mode of the image forming apparatus 200 is shifted from the standby mode to the power saving mode when exchanging the toner bottles. The process is mainly executed by the CPU 151 mounted on the image processing controller section.

Based on the detection result from the door sensor 191 received via the I/O interface 152, the CPU 151 decides whether or not the front door 194 of the image forming apparatus 200 is opened (S321). If it is decided that the front door 194 is opened (S321: Yes), the CPU 151 decides whether the notification received from the CPU 101 represents "there is toner" or "there is no toner" (S322). If the received notification represents "there is toner" (S322: Yes), the CPU 151 gives an instruction to display the information of "Please close the front door" on the display screen of the operation unit 181 (S323).

Thereafter, based on the detection result from the door sensor 191, the CPU 151 decides whether or not the front door 194 is closed (S324). If the front door 194 is closed (S324: Yes), the CPU 151 decides whether or not the notification instructing to shift to the power saving mode is received from the CPU 101 (S329). In response to the receipt of the notification instructing to shift to the power saving mode (S329: Yes), the CPU 151 give an instruction to the I/O interface 152 to turn off the relay ON signal and then, shifts the image forming apparatus 200 from the standby mode to the power saving mode (S330).

On the other hand, if the received notification represents "there is no toner" (S322: No), the CPU 151 gives an instruction to display the "guide to exchange toner bottle" on the display screen of the operation unit 181 (S325). Note that, as previously mentioned, toner color information and toner residual amount information are notified through the notification.

Based on the detection result from the door sensor 191, the CPU 151 decides whether or not the front door 194 of the image forming apparatus 200 is closed. If the front door 194 is closed (S326: Yes), the CPU 151 gives an instruction to display information of "in return operation" in an operation unit 181 (S327). Thereafter, the CPU 151 waits for the notification of "there is toner" or "there is no toner" (S328). If the received notification represents "there is toner" (S328: Yes), the CPU 151 proceeds to the process of step S329. If the received notification represents "there is no toner" (S328: No), the CPU 151 again gives an instruction to display the "guide to exchange toner bottle" on the display screen of the operation unit 181 (S325).

Figure 7:
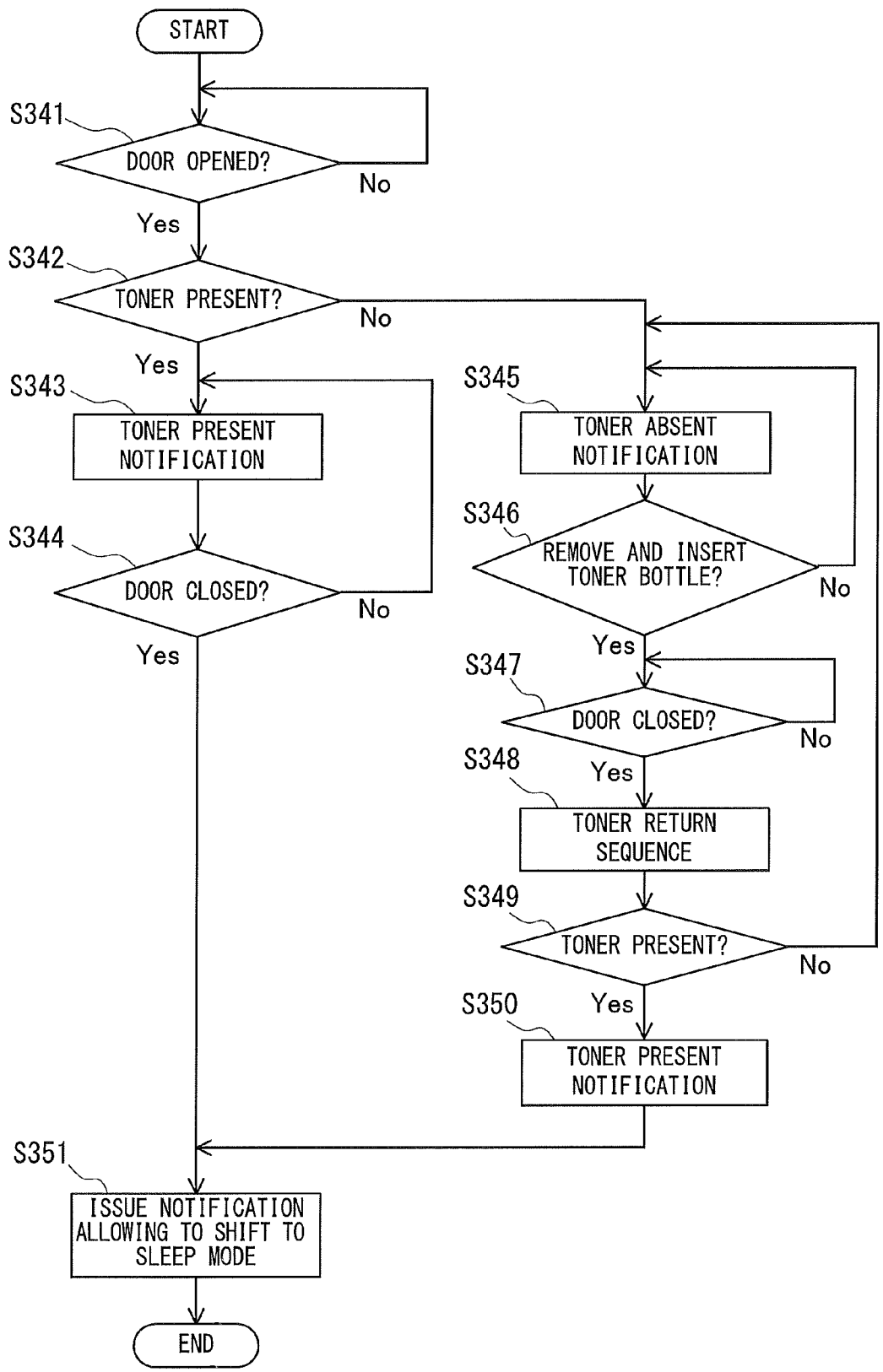
FIG. 7 is a flowchart illustrating an example of process procedure executed by CPU mounted on control section when exchanging toner bottle.

FIG. 7 is a flowchart illustrating an example of process procedure performed by the CPU 101 mounted on the control section 190 when exchanging the toner bottle.

Based on the detection result from the door sensor 191 received via the I/O interface 206, the CPU 101 decides whether or not the front door 194 of the image forming apparatus 200 is opened (S341). If it is decided that the front door 194 is opened (S341: Yes), the CPU 101 decides the presence/absence of toner residual amount based on the detection result from the toner sensors (111a to 111d). If it is decided that "there is toner" (S342: Yes), the CPU 101 notifies the CPU 151 of "there is toner" (S343). Thereafter, based on the detection result from the door sensor 191, the CPU 101 decides whether or not the front door 194 is closed (S344). If the front door 194 is closed (S344: Yes), the CPU 101 issues a notification to the CPU 151 allowing the image forming apparatus 200 to shift to the power saving mode (S351).

On the other hand, if it is decided that "there is no toner" (S324: No), the CPU 101 notifies the CPU 151 of the color information as well as the fact that it is in "there is no toner" state (S345). The CPU 101 detects a removal of a toner bottle (Ta to Td) and an insertion of a toner bottle by detecting whether or not a logic of the toner bottle sensors (118a to 118d) is changed (S346). If the removal of a toner bottle of a finished color is detected and then the insertion of a toner bottle of the finished color is detected (S346: Yes), the CPU 101 decides whether or not the front door 194 is closed based on the detection result from the door sensor 191 (S347).

If the front door 194 is closed (S347: Yes), the CPU 101 instructs to execute the toner return sequence (S348). Thereafter, based on the detection result from the toner sensors (111a to 111d), the CPU 101 again decides the presence/absence of the toner residual amount. If it is decided that "there is toner" (S349: Yes), the CPU 101 notifies the CPU 151 of "there is toner" (S350). Thereafter, the CPU 101 proceeds to the process of step S351. Note that if it is decided that "there is no toner" (S349: No), the CPU 101 continues to notify CPU 151 of the color information as well as the fact that it is in "there is no toner" state. (S345).

<Recovery Toner Bottle Exchange Operation>

Figure 8A:
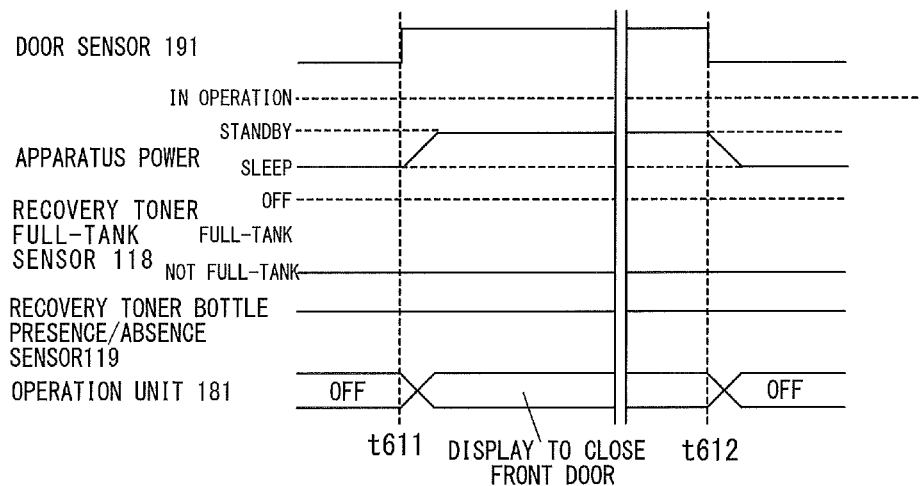
FIGS. 8A and 8B are timing charts when exchanging recovery toner bottle in the image forming apparatus.
Figure 8B:
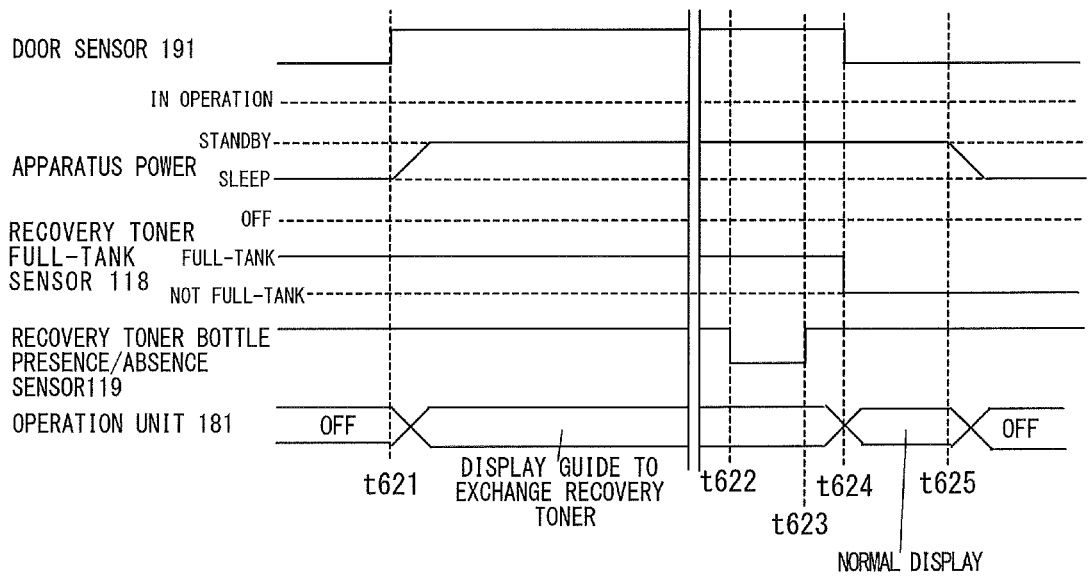

FIGS. 8A and 8B are timing charts when exchanging a recovery toner bottle in the image forming apparatus 200. FIG. 8A is a timing chart in a case where the recovery toner bottle is not full. FIG. 8B is a timing chart in a case where the recovery toner bottle is full. Description will be made with regard to the operation of the image forming apparatus 200 when exchanging the recovery toner bottle.

Description is made with regard to the operation of the image forming apparatus 200 when the recovery toner bottle is not full (not full-tank state) with FIG. 8A.

When the user opens the front door 194 of the image forming apparatus 200 which is in the power saving mode (time t611), the I/O interface 152 detects the ON signal from the door sensor 191. Then, the I/O interface 152 outputs the relay ON signal. This activates the switching power supply 202, thereby the CPU 151, the CPU 101 and the operation unit 181 are activated. Then, the mode of the image forming apparatus 200 is shifted to the standby mode.

If the recovery toner bottle is not in full-tank state based on the detection result from the full-tank sensor 115, the CPU 101 notifies the CPU 151 of the information that the recovery toner bottle is in "not full-tank state". Based on the information, the CPU 151 causes the operation unit 181 to display the message of "Please close the front door" on the display screen of the same. Thereafter, if it is detected that the front door 194 is closed (time t612), the CPU 151 gives an instruction to the I/O interface 152 to turn off the relay ON signal in response to the receipt of the notification from the CPU 101 instructing to shift to the power saving mode. In this way, the mode of the image forming apparatus 200 again is shifted to the power saving mode.

Description is made with regard to the operation of the image forming apparatus 200 when the recovery toner bottle is in full-state with FIG. 8B.

When the user opens the front door 194 of the image forming apparatus 200 which is in the power saving mode (time t621), the I/O interface 152 detects the ON signal from the door sensor 191. Then, the I/O interface 152 outputs the relay ON signal. This operates the switching power supply 202. The CPU 151, the CPU 101 and the operation unit 181 are activated. Then, the mode of the image forming apparatus 200 is shifted to the standby mode.

If the recovery toner bottle is in full-tank state based on the detection result from the full-tank sensor 115, the CPU 101 notifies the CPU 151 of the information that the recovery toner bottle is in "full-tank state". Based on the information, the CPU 151 causes the display screen of the operation unit 181 to display the "guide to exchange recovery toner bottle". The guide to exchange recovery toner bottle indicates a procedure when the user actually exchanges the recovery toner bottle.

Thereafter, the user exchanges the recovery toner bottle in accordance with the operation procedure displayed on the operation unit 181 (time t622, time t623).

After a toner bottle is inserted and the CPU 101 detects that the front door 194 is closed (time t624), when the detection result from the full-tank sensor 115 turns to not full-tank state", the CPU 101 notifies the CPU 151 of the information that the recovery toner bottle is in not full-tank state". The CPU 151 receives the notification from the CPU 101 notifying that the recovery toner is in "not full-tank state". Thereafter, in response to the receipt of the notification instructing to shift to the power saving mode, the CPU 151 gives an instruction to the I/O interface 152 to turn off the relay ON signal. In this way, the image forming apparatus 200 is again shifted to the power saving mode.

Figure 9:
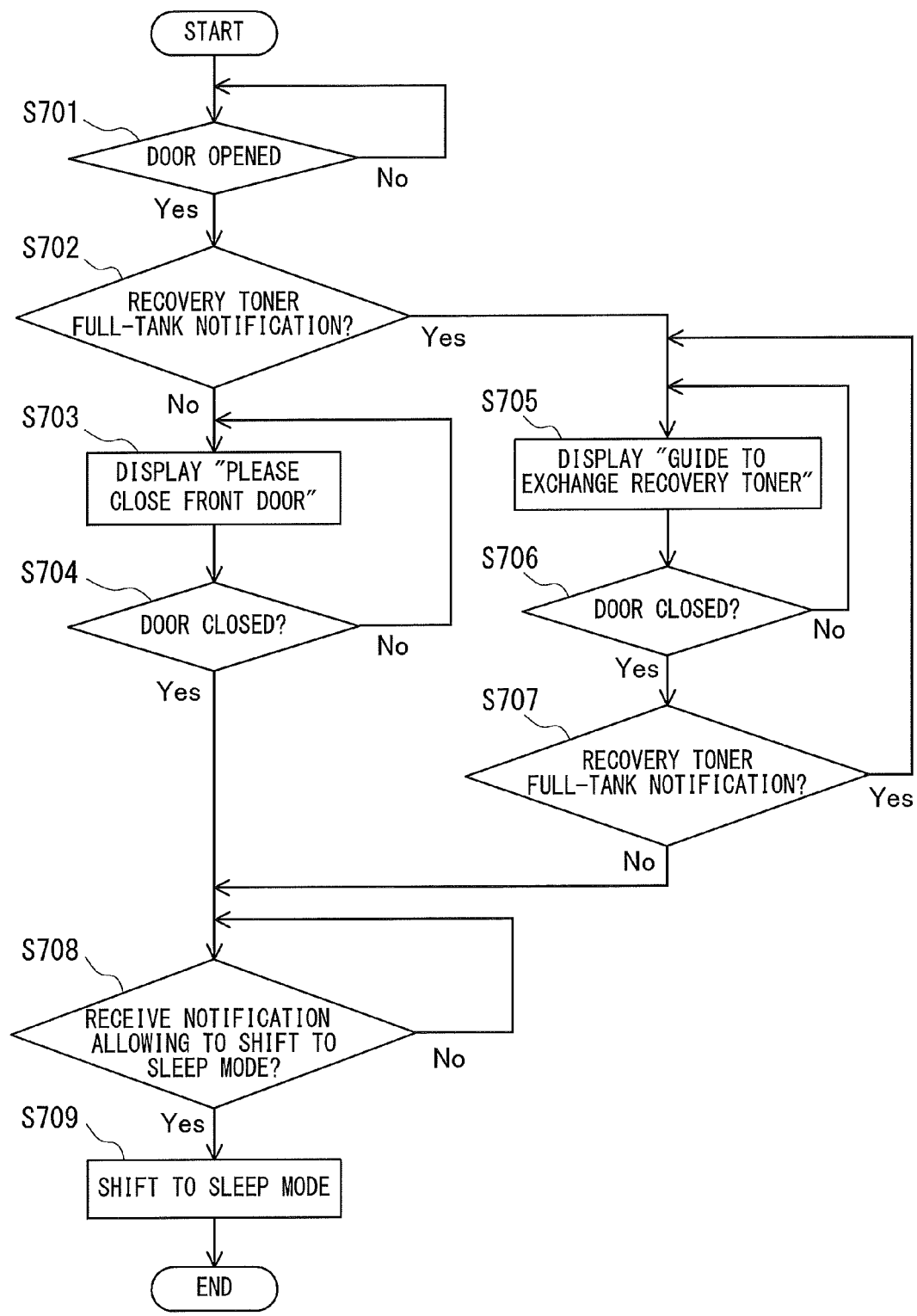
FIG. 9 is a flowchart illustrating an example of process procedure of the image forming apparatus when exchanging toner bottle.

FIG. 9 is a flowchart illustrating an example of process procedure of the image forming apparatus 200 when exchanging the recovery toner bottle. Note that this is a process procedure that the mode of the image forming apparatus 200 is shifted from the standby mode to the power saving mode when exchanging the recovery toner bottle. The process is mainly executed by the CPU 151 mounted on the image processing controller section 150.

The CPU 151 decides whether or not the front door 194 of the image forming apparatus 200 is opened based on the detection result from the door sensor 191 received via the I/O interface 152 (S701). If it is decided that the front door 194 is opened (S701: Yes), the CPU 151 decides the notification received from the CPU 101, whether the recovery toner bottle is "in full-tank state" or in not full-tank state" (S702). If the received notification shows that the recovery toner bottle is in not full-tank state" (S702: No), the CPU gives an instruction to display information of "Please close the front door" on the display screen of the operation unit 181 (S703). Thereafter, the CPU 151 decides whether or not the front door 194 is closed based on the detection result from the door sensor 191 (S704). When the front door 194 is closed (S704: Yes), the CPU 151 decides whether or not the notification instructing to shift to the power saving mode is received from the CPU 101 (S708). In response to the receipt of the notification instructing to shift to the power saving mode (S708: Yes), the CPU 151 gives an instruction to the I/O interface 152 to turn off the relay ON signal. Then, the mode of the image forming apparatus 200 is shifted from the standby mode to the power saving mode (S709).

On the other hand, if the received notification represents that the recovery toner bottle is in "full-tank state" (S702: Yes), the CPU 151 gives an instruction to display the "guide to exchange recovery toner bottle" on the display screen of the operation unit 181 (S705). The CPU 151 decides whether or not the front door 194 of the image forming apparatus 200 is closed based on the detection result from the door sensor 191 (S706). If it is decided that the front door 194 is closed (S706: Yes), the CPU 151 waits for the notification from the CPU 101 notifying the state of the recovery toner bottle (S707). If the received notification represents that the recovery toner bottle is in "not full-tank state" (S707: No), the CPU 151 proceeds to the process of step S708. If the received notification represents that the recovery toner bottle is in "full-tank state" (S707: Yes), the CPU 151 again gives an instruction to display the "guide to exchange recovery toner bottle" on the display screen of the operation unit 181 (S705).

Figure 10:
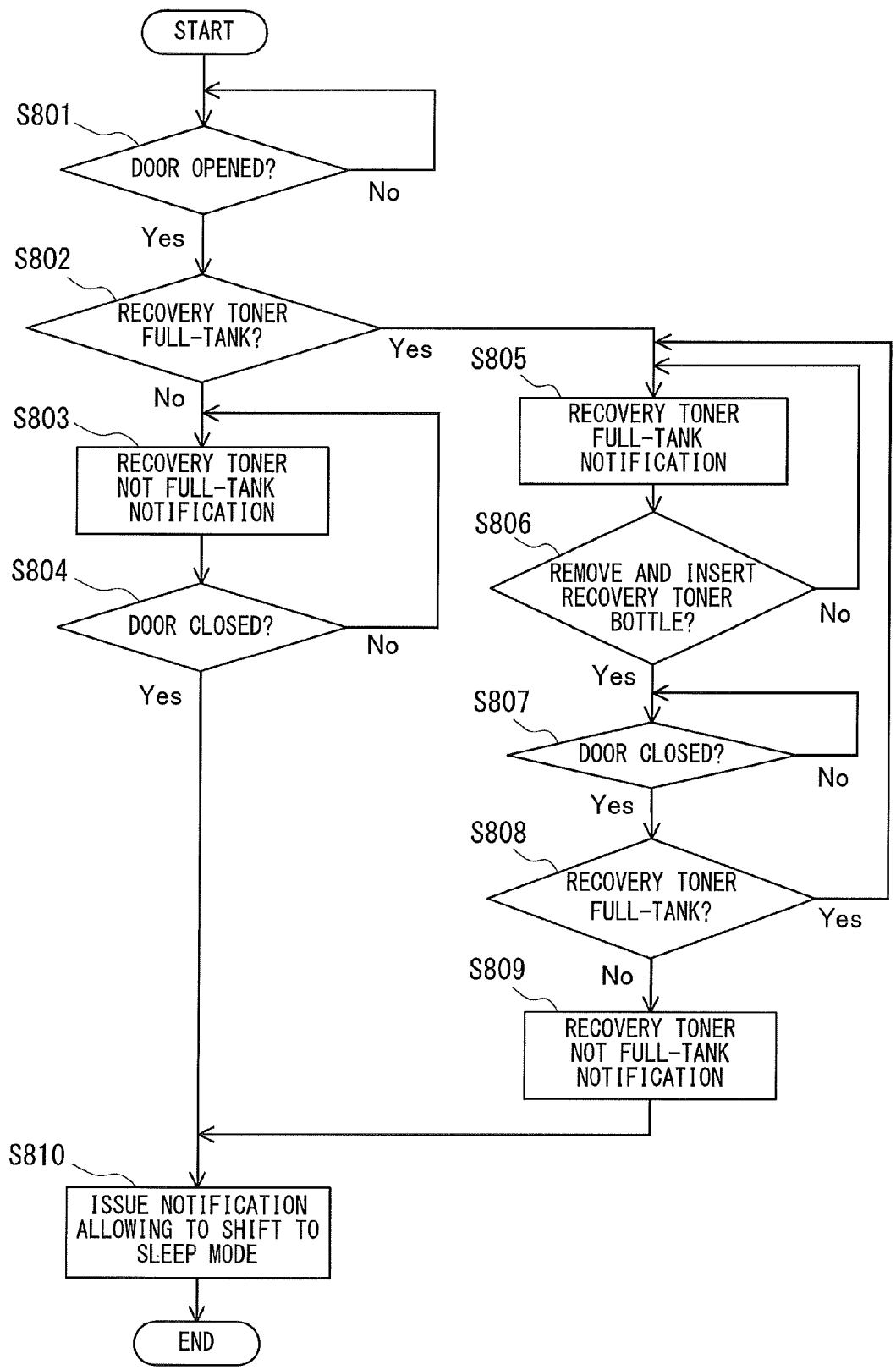
FIG. 10 is a flowchart illustrating an example of process procedure executed by CPU mounted on control section when exchanging recovery toner bottle.

FIG. 10 is a flowchart illustrating an example of process procedure executed by the CPU 101 mounted on the control section 190 when exchanging the recovery toner bottle.

The CPU 101 decides whether or not the front door 194 of the image forming apparatus 200 is opened based on the detection result from the door sensor 191 received via the I/O interface 206 (S801). If it is decided that the front door 194 is opened (S801: Yes), the CPU 101 decides whether or not the recovery toner bottle is in full-tank state based on the detection result from the full-tank sensor 115 (S802). If it is decided that the recovery toner bottle is in "not full-tank state" (S802: No), the CPU 101 notifies the CPU 151 of the fact that the recovery toner bottle is in "not full-tank state" (S803). Thereafter, the CPU 101 decides whether or not the front door 194 is closed based on the detection result from the door sensor 191 (S804). When the front door 194 is closed (S804: Yes), the CPU 101 issues a notification to the CPU 151 instructing to shift to the power saving mode (S810).

On the other hand, if it is decided that the recovery toner bottle is in "full-tank state" (S802: Yes), the CPU 101 notifies the CPU 151 of the fact that the recovery toner bottle is in "full-tank state" (S805).

The CPU 101 detects a removal of a recovery toner bottle and an insertion of a recovery toner bottle by detecting whether or not a logic of the recovery toner bottle sensor 119 is changed (S806). If the removal of a recovery toner bottle is detected and then the insertion of a recovery toner bottle is detected (S806: Yes), the CPU 101 decides whether or not the front door 194 is closed based on the detection result from the door sensor 191 (S807). If the front door 194 is closed (S807: Yes), the CPU 101 decides whether or not the recovery toner bottle inserted is in full-tank state based on the detection result from the full-tank sensor 115 (S808). If it is decided that the recovery toner bottle is in "not full-tanks state" (S808: No), the CPU 101 notifies the CPU 151 of the fact that the recovery toner bottle is in "not full-tank state" (S809). Then, the process proceeds to step S810. Note that when it is decided that the recovery toner bottle is in "full-tank state" (S808: Yes), the CPU 101 continues to notify the CPU 151 of the fact that the recovery toner bottle is in "full-tank state" (S805).

As mentioned, the image forming apparatus 200 of the present embodiment returns from the power saving mode to the standby mode to turn the CPU 101, the CPU 151 and the like to the operation state even when the image forming apparatus 200 is in the power saving mode. Therefore, the exchange of the toner bottle or the recovery toner bottle can be detected through the CPU 101 and the CPU 151. Therefore, even if the exchange operation of the consumable material such as toner is started when the image forming apparatus 200 is in the power saving mode, the start of the exchange procedure of the consumable material can be detected.

Also, the exchange operation procedure of the consumable material can certainly be presented to the user.

In the image forming apparatus 200 of the present embodiment, description has been made with regard to exchanging consumable materials, such as the toner bottles Ta, Tb, Tc, and Td and the recovery toner bottle, by opening the front door 194. Not limited to these consumable materials, other consumable materials can be exchanged in similar manner. Also, consumable material needed to be exchanged by opening a door other than the front door 194 (for example, right door 193) mounted on the image forming apparatus 200, the consumable material can be exchanged in similar manner. The above embodiments are only the examples to specifically explain the present invention. Therefore, the scope of the invention is not limited to these embodiments. For example, the present invention can be used as a printer, a copying machine, or a multifunction peripheral integrated these functions or other image forming apparatus.

The present invention has been described in detail by way of the above-mentioned embodiments, but the scope of the present invention is not limited to those embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-204057, filed Sep. 30, 2013, which is hereby incorporated by reference herein in its entirety.

What is claimed is:

1. An image forming apparatus comprising a plurality of devices driven by power and configured to be operable in:
   1) a standby mode in which power is supplied to the plurality of devices and the image forming apparatus stands by a start of an image formation; and
   2) a power saving mode in which power supply to a part of the plurality of devices is stopped so that the power consumption of the image forming apparatus in the power saving mode is reduced compared with that of the image forming apparatus in the standby mode, comprising:
   a door which is opened when consumable material is replaced;
   a detection unit configured to detect whether or not a replacement of the consumable material is required;

a door opened/closed detection unit configured to detect the door opening or door closing both in the standby mode and in the power saving mode;

a first power supply configured to supply power to the door opening/closing detection unit when the image forming apparatus is in the power saving mode;

a display unit configured to display information;

a control unit configured to display a guide to replace the consumable material on the display unit when the door opening is detected by the door opening/closing detection unit in the power saving mode and it is detected by the detection unit that the replacement of the consumable material is required;

a second power supply configured to supply power to the control unit; and a power control unit, when the image forming apparatus is in the power saving mode, configured to stop power supply from the second power supply to the control unit when the door opening is not detected by the door opening/closing detection unit, and configured to allow power supply from the second power supply to the control unit when the door opening is detected by the door opening/closing detection unit.

2. The image forming apparatus according to claim 1, wherein the control unit is configured to display a guide to close the door on the display unit when the door opening is detected by the door opening/closing detection unit in the power saving mode and it is not detected by the detection unit that the replacement of the consumable material is required.

3. The image forming apparatus according to claim 1, further comprising a shift unit configured to shift, when the image forming apparatus is in the power saving mode, a mode of the image forming apparatus to the standby mode when the door opening is detected by the door opening/closing detection unit.

4. The image forming apparatus according to claim 3, further comprising:
a toner container for storing toner used during an image forming operation; and
a toner amount detection unit configured to detect toner amount in the toner container,
wherein the control unit is configured to display, when the image forming apparatus is in the power saving mode, a predetermined guide corresponding to a detection result from the toner amount detection unit when the door opening is detected by the door opening/closing detection unit.

5. The image forming apparatus according to claim 4, further comprising a toner container detection unit configured to detect presence or absence of a toner container,
wherein, in case where the toner container detection unit detects transition from presence to absence of a toner container and then detects transition from absence to presence of a toner container during a period of time between the detection of the door opening by the door opening/closing detection unit and the detection of the door closing in the standby mode,
the shift unit is configured to:
1) shift the mode of the image forming apparatus to the power saving mode when it is detected by the toner amount detection unit that there is toner;
2) maintain the standby mode when it is not detected by the toner amount detection unit that there is toner.

6. The image forming apparatus according to claim 5, further comprising a stirring unit configured to stir the toner in the toner container,
wherein the stirring unit stirs the toner in the toner container for a predetermined time after the detection of the transition from absence to presence of the toner container by the toner container detection unit and before the detection of toner amount by the toner amount detection unit.

7. The image forming apparatus according to claim 1, further comprising a recovery toner amount detection unit configured to detect an amount of a recovery toner which is not transferred and recovered at an image forming operation;
wherein the display unit is configured to display a predetermined guide corresponding to a detection result from the recovery toner amount detection unit when the door opening is detected by the door opening/closing detection unit when the image forming apparatus is in the power saving mode.

8. The image forming apparatus according to claim 7, further comprising a recovery toner container detection unit configured to detect presence or absence of a recovery toner container for storing the recovered toner and arranged in the image forming apparatus,
wherein, in case where the recovery toner container detection unit detects transition from presence to absence of the recovery toner container and then detects transition from absence to presence of a toner container during a period of time between the detection of the door opening by the door opening/closing detection unit and the detection of the door closing in the standby mode,
the shift unit is configured to:
1) shift the mode of the image forming apparatus to the power saving mode when it is not detected by the recovery toner amount detection unit that the transfer residual toner cannot be stored in the recovery toner container;
2) maintain the standby mode when it is detected by the recovery toner amount detection unit that the transfer remaining toner cannot be stored.

9. The image forming apparatus according to claim 1, wherein the power control unit comprises a relay between a commercial power supply and the second power supply;
wherein power supply from the second power supply to the control unit is interrupted by turning off the relay.

* * * * *